US006017045A

United States Patent [19]

Dermody

[11] Patent Number: 6,017,045

[45] Date of Patent: Jan. 25, 2000

[54] SAFETY INSERT FOR TRUCK STEPS

[76] Inventor: Cecil E. Dermody, 2820 Smilax Ave., Louisville, Ky. 40213

[21] Appl. No.: 09/218,665

[22] Filed: Dec. 22, 1998

[51] Int. Cl.[7] .......... B60R 3/00

[52] U.S. Cl. .......... 280/169; 280/163

[58] Field of Search .......... 280/163, 165, 280/166, 169; 182/91, 92, 93, 96, 150, 206

[56] References Cited

U.S. PATENT DOCUMENTS

| | | | |
|---|---|---|---|
| 4,017,093 | 4/1977 | Stecker, Sr. | 280/163 |
| 4,753,447 | 6/1988 | Hall | 280/163 |
| 4,911,264 | 3/1990 | McCafferty | 182/92 |
| 4,943,085 | 7/1990 | Straka | 280/169 |
| 5,026,082 | 6/1991 | Sipp et al. | 280/166 |
| 5,265,896 | 11/1993 | Kravitz | 280/163 |
| 5,456,479 | 10/1995 | Conger et al. | 280/166 |

*Primary Examiner*—Richard M. Camby
*Attorney, Agent, or Firm*—Henderson & Sturm

[57] ABSTRACT

A safety insert 10 for a generally U-shaped tubular step bar member 110 attached to a vehicle chassis 101 wherein the safety insert 10 comprises a support plate member 20 provided with a plurality of mounting apertures 30 which are dimensioned to receive a portion of a plurality of clamp members 30 which at least partially surround different portions of the step bar member 110.

4 Claims, 1 Drawing Sheet

SAFETY INSERT FOR TRUCK STEPS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of truck step constructions in general, and in particular to an insert plate for open tubular truck step arrangements.

2. Description of Related Art

As can be seen by reference to the following U.S. Pat. Nos. 4,017,093; 4,753,447; 4,911,264; and 5,265,896, the prior art is replete with myriad and diverse vehicle step constructions.

While all of the aforementioned prior art constructions are more than adequate for the basic purpose and function for which they have been specifically designed, they are uniformly deficient with respect to their failure to provide a simple, efficient, and practical after market insert that can be installed on a conventional step bar to provide secure traction during wet and/or slippery conditions.

While most vehicle owners are aware of the aesthetic enhancement provided by generally U-shaped tubular step bars in lieu of more conventional vehicle step arrangements, they are also becoming cognizant of the fact that the tubular steps do not afford the safest or most secure form of footing as one enters or exits from a vehicle.

As a consequence of the foregoing situation, there has existed a longstanding need for a new and improved after market safety insert that can be installed on a conventional step bar to provide a secure footing support surface in the step bar opening, and the provision of such a construction is a stated objective of the present invention.

BRIEF SUMMARY OF THE INVENTION

Briefly stated, the safety insert that forms the basis of the present invention comprises in general, an insert unit and a connector unit that will operatively support the insert unit within the opening formed between the step bar and the vehicle chassis.

As will be explained in greater detail further on in the specification, the insert unit comprises a generally rectangular support plate member provided with a plurality of mounting apertures dimensioned to receive the connector unit.

In addition, the connector unit comprises a plurality of connector clamp members which are dimensioned to slidably surround different portions of the step bar and be received in the mounting apertures in the support plate member to suspend the support plate member within the step bar opening.

In one versions of the preferred embodiment, the support plate member includes an open mesh style panel suspended within a generally rectangular framework element and in the other version of the preferred embodiment, the support plate member comprises a solid, textured panel that is directly connected to the step bar.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
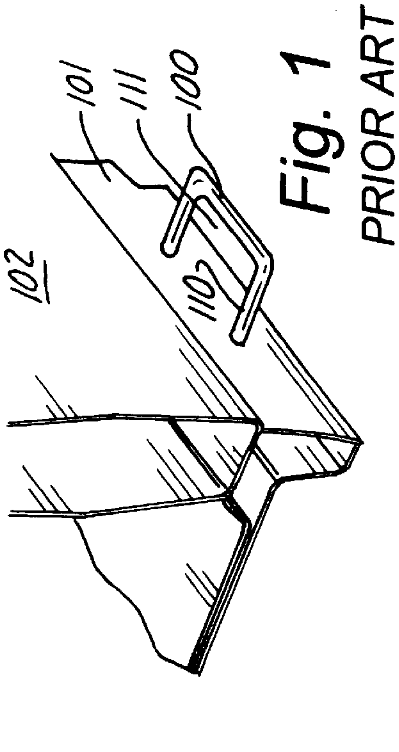
FIG. 1 is a perspective view showing a prior art tubular step bar attached to the chassis of a vehicle.

As can be seen by reference to the drawings, and in particularly to FIG. 1, the safety insert for truck steps that forms the basis of the present invention is designated generally by the reference number 10. The safety insert 10 comprises in general, an insert unit 11, and a connector unit 12. These units will now be described in seriatim fashion.

As shown in FIG. 1, this invention was specifically designed as an add-on feature for a conventional tubular step bar 100 which is mounted on the chassis of a vehicle 102.

As can be seen by reference to FIGS. 1 through 4, the vehicle step bar 100 comprises a generally U-shaped tubular member 110 having a generally rectangular opening 111 formed therein.

Figure 2:
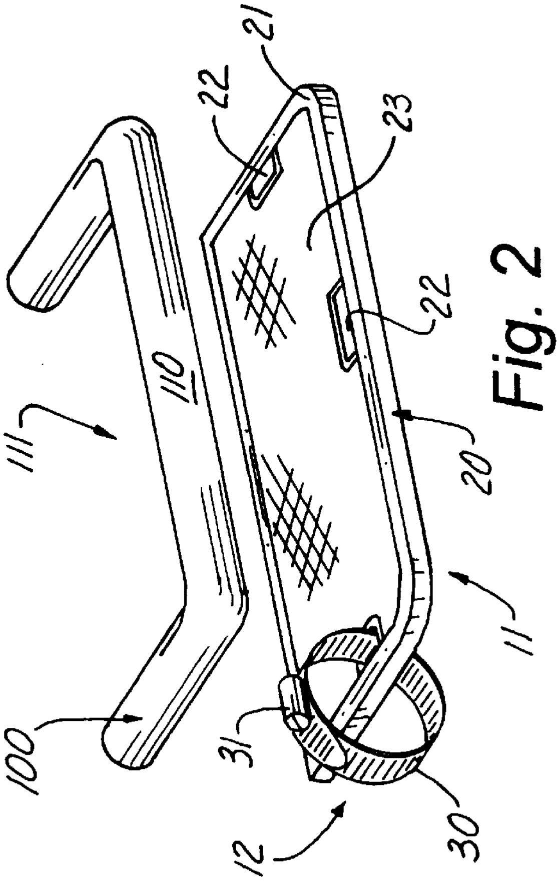
FIG. 2 is an exploded perspective view of one version of the safety insert and the step bar.

In the first version of the preferred embodiment depicted in FIG. 2, the insert unit 11 comprises a support plate member 20 including an outer framework element 21 which is provided with a plurality of mounting apertures 22. The support plate member 20 further includes an open mesh panel 23 which extends across and is suspended from the outer generally rectangular framework element.

Figure 3:
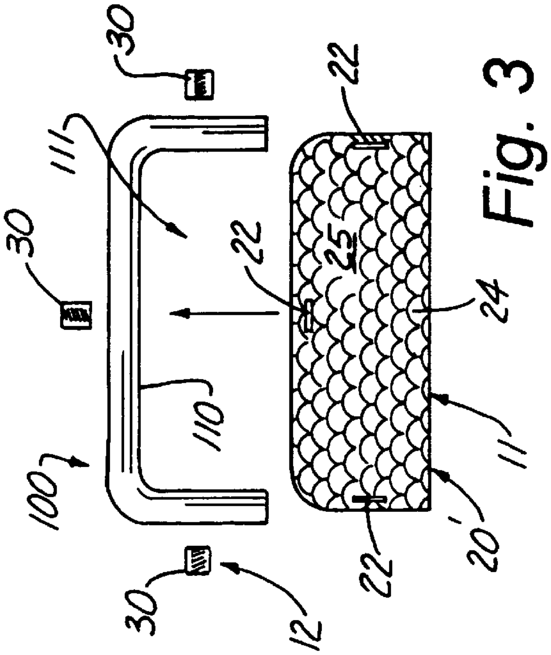
FIG. 3 is an exploded top plan view of another version of the safety insert and the step bar.
Figure 4:
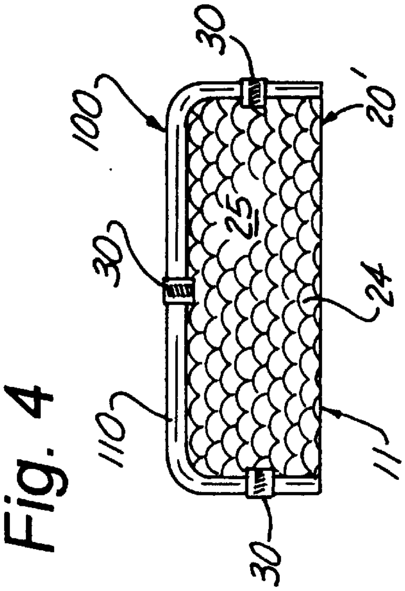
FIG. 4 is a top plan view of the step bar and safety insert of FIG. 3 in the assembled mode.

In the second version of the preferred embodiment illustrated in FIGS. 3 and 4, the insert unit 11 comprises a support plate member 20' fabricated from a solid generally rectangular panel element 24 having a textured surface 25 to provide for improved traction.

At this juncture, it should be noted that while the first version of the preferred embodiment depicted in FIG. 2 is shown and described as an open mesh panel 23. This terminology is also intended to encompass an open grid type pattern wherein the openings in the mesh or grid patterns allow rain, snow, and other debris to fall by gravity through the openings to keep the support plate member 20 relatively clean and slip proof.

It should further be noted that in both versions of the preferred embodiment, the support panel members 20 and 20' are dimensioned to be received in the central opening 111 in the step bar member 110.

Returning once more to FIGS. 2 through 4, it can be seen that in both versions of the preferred embodiment, the connector unit 12 comprises a plurality of worm gear style clamp members 30 which are dimensioned to surround different portions of the step bar member 110 and pass through the respective mounting apertures 22 for suspending the support plate members 20 and 20' within the opening 111 in the step bar member 110.

In addition, the clamp members 30 are further provided with a screw actuated mechanism 31 for loosening and tightening the clamp members 30 in a well recognized fashion.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. In a vehicle equipped with a generally U-shaped tubular step bar attached to the vehicle chassis wherein the interior of the step bar defines an enlarged opening, the improvement comprising:

a safety insert including an insert unit comprising a support plate member dimensioned to be at least partially received within said enlarged opening in the step bar; and provided with a plurality of mounting apertures;

means for operatively engaging the support plate member with said step bar including a plurality of clamp members wherein each clamp member has a portion dimensioned to be received in one of said plurality of mounting apertures; and wherein each of said clamp members has a portion dimensioned to at least partially surround the periphery of a portion of the step bar.

2. The improvement as in claim 1 wherein said support plate member comprises a framework element which supports an open mesh panel.

3. The improvement as in claim 1 wherein said support plate member is fabricated from a solid panel element.

4. The improvement as in claim 3 wherein said solid panel element is provided with a textured surface.

* * * * *